United States Patent
Aoki et al.

(10) Patent No.: US 11,203,603 B2
(45) Date of Patent: Dec. 21, 2021

(54) CARBONATE-CONTAINING SILANE COMPOUND AND MAKING METHOD

(71) Applicant: SHIN-ETSU CHEMICAL CO., LTD., Tokyo (JP)

(72) Inventors: Shotaro Aoki, Joetsu (JP); Yoichi Tonomura, Joetsu (JP); Yasufumi Kubota, Joetsu (JP); Ayumu Kiyomori, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/425,640

(22) Filed: May 29, 2019

(65) Prior Publication Data

US 2019/0367539 A1   Dec. 5, 2019

(30) Foreign Application Priority Data

May 30, 2018   (JP) .............................. JP2018-103445

(51) Int. Cl.
*C07F 7/08* (2006.01)
*H01M 10/052* (2010.01)
*H01M 10/0567* (2010.01)

(52) U.S. Cl.
CPC ........... *C07F 7/081* (2013.01); *H01M 10/052* (2013.01); *H01M 10/0567* (2013.01); *H01M 2300/0025* (2013.01)

(58) Field of Classification Search
CPC ........... H01M 10/052; H01M 10/0567; H01M 2300/0025
See application file for complete search history.

(56) References Cited

U.S. PATENT DOCUMENTS

| | | | | |
|---|---|---|---|---|
| 3,338,869 A | * | 8/1967 | Haluska | H01B 3/46 528/10 |
| 5,610,252 A | * | 3/1997 | Bambury | C07C 69/96 526/279 |
| 7,425,283 B2 | | 9/2008 | Nakanishi et al. | |
| 2005/0170253 A1 | * | 8/2005 | Yoon | H01M 10/0569 429/307 |
| 2007/0048620 A1 | * | 3/2007 | Nakanishi | H01G 11/64 429/326 |
| 2012/0082890 A1 | * | 4/2012 | Dong | H01M 50/411 429/188 |
| 2019/0341653 A1 | * | 11/2019 | Dzwiniel | H01M 10/0569 |

FOREIGN PATENT DOCUMENTS

JP   2007-77075 A   3/2007

OTHER PUBLICATIONS

Zamora et al., Bioconjugate Chem. 2002, 13, 920-926. (Year: 2002).*
Sakurai et al., Bull. Chem Soc of Japan, 1964, 1894-1895 (Year: 1964).*
Ito et al., 47 Angewandte Chemie, International Edition, 7424-7427 (2008) (Year: 2008).*
C. Kreutzberger, "Chloroformates and carbonates" Kirk-Othmer Encyclopedia of Chemical Technology, 290-323 (2000) (Year: 2000).*
B. Trost et al., Synthesis, 151-156 (1992) (Year: 1992).*
CAS Abstract of H. Ito et al., 47 Angewandte Chemie, International Edition, 7424-7427 (2008) (Year: 2008).*
Extended European Search Report dated Oct. 24, 2019, in European Patent Application No. 19176902.5.
Zamora et al., "Local Delivery of Basic Fibroblast Growth Factor (bFGF) Using Adsorbed Silyl-heparin, Benzyl-bis(dimethyisilylmethyl)oxycarbamoyl-heparin," Bioconjugate Chem. (2002), vol. 13, pp. 920-926.

* cited by examiner

*Primary Examiner* — Alexander R Pagano
(74) *Attorney, Agent, or Firm* — Birch, Stewart, Kolasch & Birch, LLP

(57) ABSTRACT

Provided is a carbonate-containing silane compound having a characteristic structure that at least two silicon atoms are linked by a carbon chain. The silane compound is chemically stable. When used as an additive to a nonaqueous electrolyte solution, the silane compound does not jeopardize the safety of lithium ion secondary batteries.

3 Claims, 8 Drawing Sheets

CARBONATE-CONTAINING SILANE COMPOUND AND MAKING METHOD

CROSS-REFERENCE TO RELATED APPLICATION

This non-provisional application claims priority under 35 U.S.C. § 119(a) on Patent Application No. 2018-103445 filed in Japan on May 30, 2018, the entire contents of which are hereby incorporated by reference.

TECHNICAL FIELD

This invention relates to a carbonate-containing silane compound and a method for preparing the same.

BACKGROUND ART

It is well known in the art that organosilicon compounds containing a carbonate group are useful as silane coupling agents, surface treating agents, adhesives, and the like. When a carbonate-containing silane coupling agent is added to a nonaqueous electrolyte solution in a lithium ion secondary battery, the electrode assumes an ideal surface state. That is, the silicon compound functions as a surface treating agent to improve the durability, heat resistance, and Li conduction of the electrode surface.

While various lithium ion secondary batteries are currently loaded in smartphones, laptop computers, electric vehicles, and the like, they are still not satisfactory with respect to discharge characteristics in a rigorous environment and discharge characteristics at high outputs requiring a large quantity of electricity within a short time.

Lithium ion secondary batteries using nonaqueous electrolyte solutions based on dimethyl carbonate or diethyl carbonate encounter the risk of battery rupture and ignition because the electrolytes will be vaporized and decomposed. It is thus desired to improve the discharge characteristics, cycle performance, and safety of lithium ion secondary batteries. Many attempts have been made for such improvements.

One attempt is to add a cyclic carbonate-modified siloxane to nonaqueous electrolyte solutions (Patent Document 1). Because of a high surface activity, the cyclic carbonate-modified siloxane is effective in improving the wetting of electrodes or separators. Therefore, the cyclic carbonate-modified siloxane contributes to improvements in discharge characteristics at low temperature and discharge characteristics at high outputs of lithium ion secondary batteries. Also, since these siloxane derivatives have satisfactory properties such as flame retardancy, low vapor pressure and low flammability, the lithium ion secondary batteries are improved in safety.

CITATION LIST

Patent Document 1: JP-A 2007-077075 (U.S. Pat. No. 7,425,283)

SUMMARY OF INVENTION

Although the cyclic carbonate-modified siloxane of Patent Document 1 exhibits low flammability, it lacks chemical stability in electrolyte solutions. That is, since fluorine-containing lithium salts such as $LiPF_4$ are used in electrolyte solutions of lithium ion secondary batteries, the siloxane bonds can be severed by the fluorine atoms. If the siloxane compound is decomposed, the vapor pressure rises, with the increased risk of ignition.

An object of the invention is to provide a carbonate-containing silane compound which is chemically stable and when used as an additive to nonaqueous electrolyte solutions, does not jeopardize the safety of lithium ion secondary batteries even during service in a rigorous environment.

The inventors have found that a carbonate-containing silane compound having a characteristic structure that at least two silicon atoms are linked by a carbon chain is useful as an intermediate of a silane coupling agent and also chemically stable in electrolyte solutions of lithium ion secondary batteries.

In one aspect, the invention provides a carbonate-containing silane compound having the general formula (1):

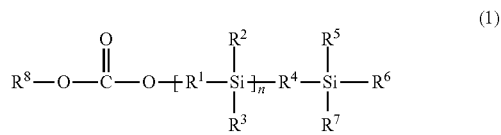

wherein $R^1$ and $R^4$ are each independently a substituted or unsubstituted $C_1$-$C_{10}$ straight or branched divalent hydrocarbon group, $R^2$, $R^3$, $R^5$, $R^6$ and $R^7$ are each independently a substituted or unsubstituted $C_1$-$C_{10}$ straight or branched alkyl or alkenyl group, $R^8$ is a substituted or unsubstituted $C_1$-$C_{10}$ monovalent hydrocarbon group, and n is 1 or 2. Preferably, at least one of $R^2$, $R^3$, $R^5$, $R^6$ and $R^7$ is a substituted or unsubstituted $C_2$-$C_{10}$ straight or branched alkenyl group.

In another aspect, the invention provides a method for preparing the carbonate-containing silane compound defined above, comprising the step of effecting condensation reaction of a silyl alcohol compound having the general formula (2):

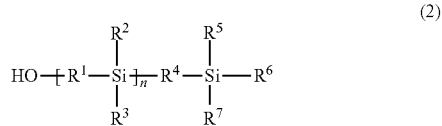

wherein $R^1$ to $R^7$ and n are as defined above, with a halogenated formate having the general formula (3):

wherein $R^8$ is as defined above and X is halogen in the presence of a base.

The base is preferably a heterocyclic amine or tertiary amine.

Advantageous Effects of Invention

The carbonate-containing silane compound of the invention having silicon atoms linked via carbon atoms is extremely stable in electrolyte solutions of lithium ion secondary batteries and thus useful as an additive to the electrolyte solutions. When the carbonate-containing silane has a double bond, it is also useful as an intermediate of a carbonate-containing silane coupling agent.

DESCRIPTION OF PREFERRED EMBODIMENTS

Figure 1:
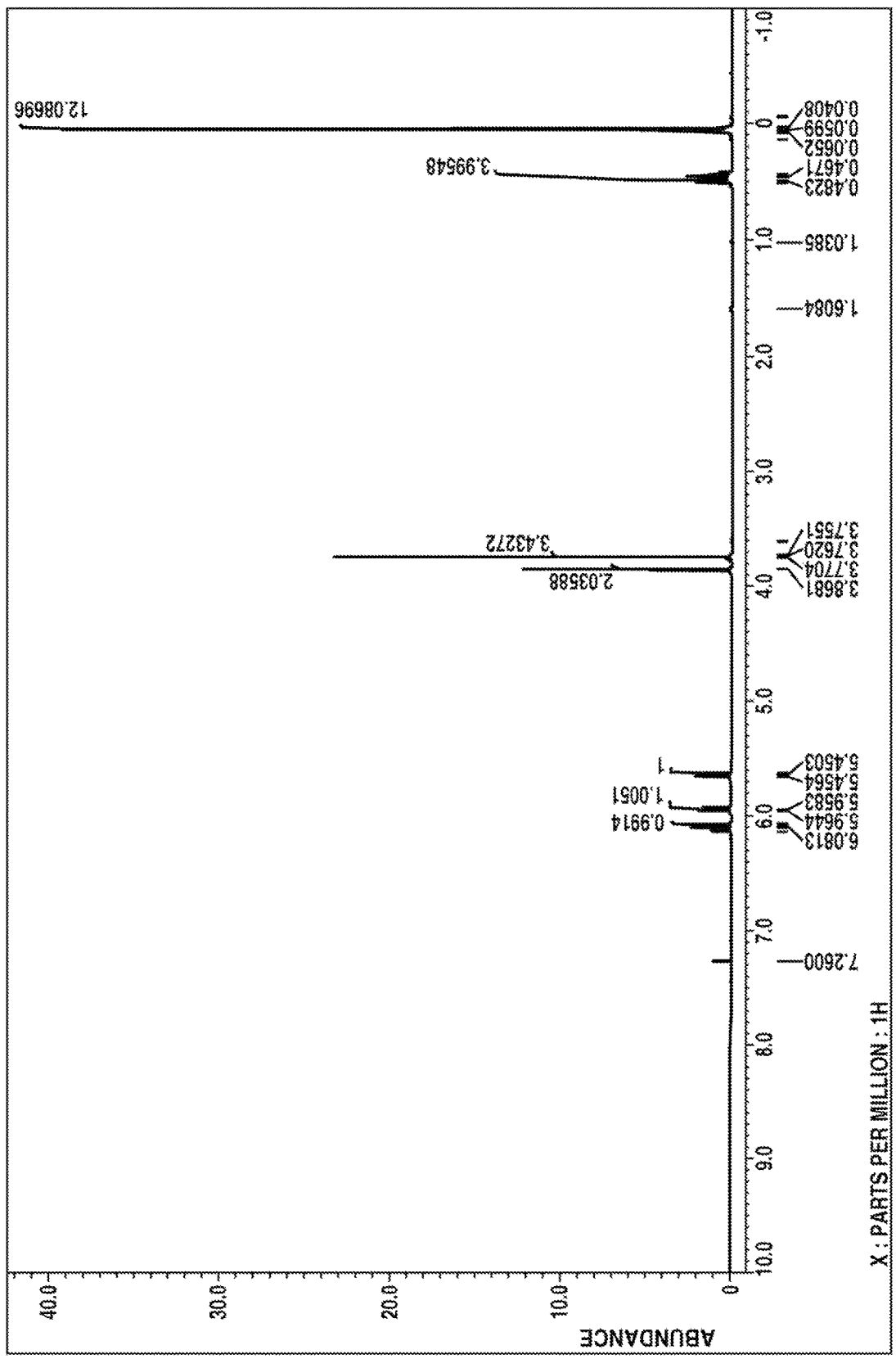
FIG. 1 is a diagram of the $^1$H-NMR spectrum of the compound obtained in Example 1.

The notation (Cn-Cm) means a group containing from n to m carbon atoms per group.

The invention provides a carbonate-containing silane compound having the general formula (1).

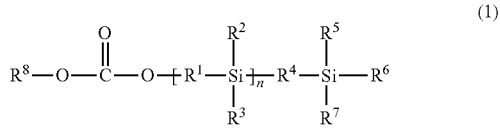

In formula (1), n is 1 or 2.

In formula (1), $R^1$ and $R^4$ are each independently a substituted or unsubstituted, straight or branched divalent hydrocarbon group of 1 to 10 carbon atoms, preferably 1 to 6 carbon atoms. Examples of the divalent hydrocarbon group include straight alkylene groups such as methylene, ethylene, trimethylene and tetramethylene; and branched alkylene groups such as isopropylene, isobutylene and isopentylene. Of these, $C_1$-$C_3$ alkylene groups such as methylene, ethylene and trimethylene are preferred for availability of the reactant. Some or all of the hydrogen atoms on the divalent hydrocarbon group may be substituted by other substituents. Suitable substituents include alkoxy groups such as methoxy, ethoxy and (iso)propoxy; halogen atoms such as fluorine, chlorine, bromine and iodine; cyano, amino, aromatic hydrocarbon, ester, alkyl separated by oxygen, acyl, sulfide, alkylsilyl, and alkoxysilyl groups, which may be used alone or in admixture of two or more. Neither the site of substitution nor the number of substituents is limited.

$R^2$, $R^3$, $R^5$, and $R^7$ are each independently a substituted or unsubstituted, straight or branched alkyl groups of 1 to 10 carbon atoms, preferably 1 to 6 carbon atoms or a substituted or unsubstituted, straight or branched alkenyl group of 2 to 10 carbon atoms, preferably 2 to 6 carbon atoms. Examples of the alkyl group include straight alkyl groups such as methyl, ethyl, n-propyl, n-butyl, n-pentyl, n-hexyl, n-heptyl, n-octyl, n-nonyl, n-decyl, n-undecyl and n-dodecyl and branched alkyl groups such as isopropyl, isobutyl, sec-butyl, tert-butyl, isopentyl, neopentyl, isohexyl, isoheptyl, isooctyl, tert-octyl, isononyl, isodecyl and isoundecyl. Examples of the alkenyl group include straight alkenyl groups such as vinyl, 1-propenyl, n-propenyl (2-propenyl or allyl), n-butenyl, n-pentenyl, n-hexenyl, n-heptenyl, n-octenyl, n-nonenyl, n-decenyl, n-undecenyl and n-dodecenyl and branched alkenyl groups such as isopropenyl, isobutenyl, isopentenyl, isohexenyl, isoheptenyl, isooctenyl, isononenyl, isodecenyl and isoundecenyl. Of these, $C_1$-$C_3$ straight alkyl groups such as methyl and ethyl and $C_2$ or $C_3$ straight alkenyl groups such as vinyl and n-propenyl are preferred for availability of the reactant. Some or all of the hydrogen atoms on the alkyl or alkenyl group may be substituted by other substituents. Suitable substituents are as exemplified above for $R^1$ and $R^4$.

$R^8$ is a substituted or unsubstituted, monovalent hydrocarbon group of 1 to 10 carbon atoms, preferably 1 to 3 carbon atoms. The monovalent hydrocarbon groups may be straight, branched or cyclic. Examples include straight alkyl groups such as methyl, ethyl, n-propyl, n-butyl, n-pentyl, n-hexyl, n-heptyl, n-octyl, n-nonyl, n-decyl, n-undecyl and n-dodecyl; branched alkyl groups such as isopropyl, isobutyl, sec-butyl, tert-butyl, isopentyl, neopentyl, isohexyl, isoheptyl, isooctyl, tert-octyl, isononyl, isodecyl and isoundecyl; cyclic alkyl groups such as cyclopentyl and cyclohexyl; straight alkenyl groups such as vinyl, n-propenyl, n-butenyl, n-pentenyl, n-hexenyl, n-heptenyl, n-octenyl, n-nonenyl, n-decenyl, n-undecenyl and n-dodecenyl and branched alkenyl groups such as isopropenyl, isobutenyl, isopentenyl, isohexenyl, isoheptenyl, isooctenyl, isononenyl, isodecenyl and isoundecenyl; aryl groups such as phenyl, tolyl and xylyl; and aralkyl groups such as benzyl, methylbenzyl, phenethyl, methylphenethyl and phenylbenzyl. Of these, $C_1$-$C_3$ straight alkyl groups such as methyl and ethyl, $C_2$ or $C_3$ straight alkenyl groups such as vinyl and n-propenyl and $C_6$-$C_8$ aryl groups such as phenyl are preferred for availability of the reactant. Some or all of the hydrogen atoms on the monovalent hydrocarbon group may be substituted by other substituents. Suitable substituents are as exemplified above for $R^1$ and $R^4$.

Since the inventive carbonate-containing silane compound has silicon introduced as a flame retardant element, as represented by formula (1), it has the advantage that it releases less harmful gas during burning than carbonate-containing silane compounds having halogen such as chlorine or fluorine introduced therein.

Examples of the compound having formula (1) include methyl [dimethyl(trimethylsilylmethyl)silyl]methyl carbonate,
ethyl [dimethyl(trimethylsilylmethyl)silyl]methyl carbonate,
methyl [3-[dimethyl(trimethylsilylmethyl)silyl]propyl] carbonate,
ethyl [3-[dimethyl(trimethylsilylmethyl)silyl]propyl] carbonate,
methyl [dimethyl[2-(trimethylsilyl)ethyl]silyl]methyl carbonate,
ethyl [dimethyl[2-(trimethylsilyl)ethyl]silyl]methyl carbonate,
methyl [3-[dimethyl[2-(trimethylsilyl)ethyl]silyl]propyl] carbonate,
ethyl [3-[dimethyl[2-(trimethylsilyl)ethyl]silyl]propyl] carbonate,
methyl [dimethyl[3-(trimethylsilyl)propyl]silyl]methyl carbonate,
ethyl [dimethyl[3-(trimethylsilyl)propyl]silyl]methyl carbonate,
methyl [3-[dimethyl[3-(trimethylsilyl)propyl]silyl]propyl] carbonate,
ethyl [3-[dimethyl[3-(trimethylsilyl)propyl]silyl]propyl] carbonate,
methyl [dimethyl(dimethylvinylsilylmethyl)silyl]methyl carbonate, ethyl [dimethyl(dimethylvinylsilylmethyl)silyl]methyl carbonate,
methyl [3-[dimethyl(dimethylvinylsilylmethyl)silyl]propyl] carbonate,
ethyl [3-[dimethyl(dimethylvinylsilylmethyl)silyl]propyl] carbonate,
methyl [dimethyl[2-(dimethylvinylsilyl)ethyl]silyl]methyl carbonate,
ethyl [dimethyl[2-(dimethylvinylsilyl)ethyl]silyl]methyl carbonate,
methyl [3-[dimethyl[2-(dimethylvinylsilyl)ethyl]silyl]propyl] carbonate,
ethyl [3-[dimethyl[2-(dimethylvinylsilyl)ethyl]silyl]propyl] carbonate,
methyl [dimethyl[3-(dimethylvinylsilyl)propyl]silyl]methyl carbonate,
ethyl [dimethyl[3-(dimethylvinylsilyl)propyl]silyl]methyl carbonate,
methyl [3-[dimethyl[3-(dimethylvinylsilyl)propyl]silyl]propyl] carbonate,
ethyl [3-[dimethyl[3-(dimethylvinylsilyl)propyl]silyl]propyl] carbonate,
methyl [dimethyl(trivinylsilylmethyl)silyl]methyl carbonate,
ethyl [dimethyl(trivinylsilylmethyl)silyl]methyl carbonate,
methyl [3-[dimethyl(trivinylsilylmethyl)silyl]propyl] carbonate,
ethyl [3-[dimethyl(trivinylsilylmethyl)silyl]propyl] carbonate,
methyl [dimethyl[2-(trivinylsilyl)ethyl] silyl]methyl carbonate,
ethyl [dimethyl[2-(trivinylsilyl)ethyl]silyl]methyl carbonate,
methyl [3-[dimethyl[2-(trivinylsilyl)ethyl]silyl]propyl] carbonate,
ethyl [3-[dimethyl[2-(trivinylsilyl)ethyl]silyl]propyl] carbonate,
methyl [dimethyl[3-(trivinylsilyl)propyl]silyl]methyl carbonate,
ethyl [dimethyl[3-(trivinylsilyl)propyl]silyl]methyl carbonate,
methyl [3-[dimethyl[3-(trivinylsilyl)propyl] silyl]propyl] carbonate,
ethyl [3-[dimethyl[3-(trivinylsilyl)propyl]silyl]propyl] carbonate,
methyl [dimethyl[dimethyl(trimethylsilylmethyl)silylmethyl]silyl]methyl carbonate,
ethyl [dimethyl[dimethyl(trimethylsilylmethyl)silylmethyl] silyl]methyl carbonate,
methyl [3-[dimethyl[dimethyl(trimethylsilylmethyl)silylmethyl] silyl] propyl] carbonate,
ethyl [3-[dimethyl[dimethyl(trimethylsilylmethyl)silylmethyl]silyl]propyl] carbonate,
methyl [dimethyl [2-[dimethyl[2-(trimethylsilyl)ethyl] silyl] ethyl] silyl] methyl carbonate,
ethyl [dimethyl[2-[dimethyl[2-(trimethylsilyl)ethyl]silyl] ethyl]silyl]methyl carbonate,
methyl [3-[dimethyl [2-[dimethyl [2-(trimethylsilyl)ethyl] silyl] ethyl] silyl]propyl] carbonate,
ethyl [3-[dimethyl [2-[dimethyl [2-(trimethylsilyl)ethyl] silyl] ethyl] silyl]propyl] carbonate,
methyl [dimethyl[dimethyl(dimethylvinylsilylmethyl)silylmethyl]silyl]methyl carbonate,
ethyl [dimethyl[dimethyl(dimethylvinylsilylmethyl)silylmethyl]silyl]methyl carbonate,
methyl [3-[dimethyl [dimethyl(dimethylvinylsilylmethyl)silylmethyl]silyl]propyl] carbonate,
ethyl [3-[dimethyl[dimethyl(dimethylvinylsilylmethyl)silyl-methyl]silyl]propyl] carbonate,
methyl [dimethyl[2-[dimethyl[2-(dimethylvinylsilyl)ethyl] silyl]ethyl]silyl]methyl carbonate,
ethyl [dimethyl[2-[dimethyl[2-(dimethylvinylsilyl)ethyl]silyl]ethyl]silyl]methyl carbonate,
methyl [3-[dimethyl [2-[dimethyl [2-(dimethylvinylsilyl) ethyl] silyl]ethyl] silyl]propyl] carbonate,
ethyl [3-[dimethyl[2-[dimethyl[2-(dimethylvinylsilyl)ethyl] silyl]ethyl]silyl]propyl] carbonate,
methyl [dimethyl[dimethyl(trivinylsilylmethyl)silylmethyl] silyl]methyl carbonate,
ethyl [dimethyl[dimethyl(trivinylsilylmethyl)silylmethyl]silyl]methyl carbonate,
methyl [3-[dimethyl[dimethyl(trivinylsilylmethyl)silylmethyl]silyl]propyl] carbonate,
ethyl [3-[dimethyl[dimethyl(trivinylsilylmethyl)silylmethyl]silyl]propyl] carbonate,
methyl [dimethyl [2-[dimethyl [2-(trivinylsilyl)ethyl] silyl] ethyl] silyl]methyl carbonate,
ethyl [dimethyl[2-[dimethyl[2-(trivinylsilyl)ethyl]silyl] ethyl]silyl]methyl carbonate,
methyl [3-[dimethyl [2-[dimethyl [2-(trivinylsilyl)ethyl]silyl]ethyl] silyl] propyl] carbonate,
and ethyl [3-[dimethyl [2-[dimethyl [2-(trivinylsilyl)ethyl] silyl]ethyl]silyl]propyl] carbonate.

The carbonate-containing silane compound having the formula (1) may be prepared by effecting condensation of a silyl alcohol compound having the formula (2) with a halogenated formate having the formula (3) in the presence of a base according to the following scheme.

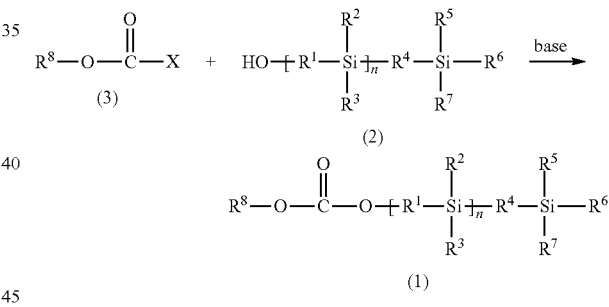

Herein $R^1$ to $R^8$, % X and n are as defined above.

Examples of the silyl alcohol compound having formula (2) include
dimethyl(trimethylsilylmethyl)silylmethanol,
3-[dimethyl(trimethylsilylmethyl)silyl]propanol,
dimethyl[2-(trimethylsilyl)ethyl]silylmethanol,
3-[dimethyl[2-(trimethylsilyl)ethyl]silyl]propanol,
dimethyl [3-(trimethylsilyl)propyl]silylmethanol,
3-[dimethyl[3-(trimethylsilyl)propyl]silyl]propanol,
dimethyl(dimethylvinylsilylmethyl)silylmethanol,
3-[dimethyl(dimethylvinylsilylmethyl)silyl]propanol,
dimethyl[2-(dimethylvinylsilyl)ethyl]silylmethanol,
3-[dimethyl[2-(dimethylvinylsilyl)ethyl]silyl]propanol,
dimethyl[3-(dimethylvinylsilyl)propyl]silylmethanol,
3-[dimethyl[3-(dimethylvinylsilyl)propyl]silyl]propanol,
dimethyl(trivinylsilylmethyl)silylmethanol,
3-[dimethyl(trivinylsilylmethyl)silyl]propanol,
dimethyl[2-(trivinylsilyl)ethyl]silylmethanol,
3-[dimethyl[2-(trivinylsilyl)ethyl]silyl]propanol,
dimethyl[3-(trivinylsilyl)propyl]silylmethanol,
3-[dimethyl[3-(trivinylsilyl)propyl]silyl]propanol, dimethyl[dimethyl(trimethylsilylmethyl)silylmethyl]silylmethanol,
3-[dimethyl[3-(trivinylsilyl)propyl]silyl]propanol,
dimethyl[dimethyl(trimethylsilylmethyl)silylmethyl]silylmethanol,
3-[dimethyl[dimethyl(trimethylsilylmethyl)silylmethyl]silyl]propanol,
dimethyl[2-[dimethyl [2-(trimethylsilyl)ethyl] silyl] ethyl] silylmethanol,
3-[dimethyl [2-[dimethyl [2-(trimethylsilyl)ethyl] silyl] ethyl]silyl] propanol,
dimethyl[dimethyl(dimethylvinylsilylmethyl)silylmethyl] silylmethanol,
3-[dimethyl[dimethyl(dimethylvinylsilylmethyl)silylmethyl]silyl]propanol,
dimethyl [2-[dimethyl [2-(dimethylvinylsilyl)ethyl] silyl] ethyl] silylmethanol,
3-[dimethyl [2-[dimethyl [2-(dimethylvinylsilyl)ethyl] silyl] ethyl] silyl] propanol,
dimethyl[dimethyl(trivinylsilylmethyl)silylmethyl]silylmethanol,
3-[dimethyl[dimethyl(trivinylsilylmethyl)silylmethyl]silyl]propanol,
dimethyl[2-[dimethyl[2-(trivinylsilyl)ethyl]silyl]ethyl]silylmethanol, and
3-[dimethyl[2-[dimethyl[2-(trivinylsilyl)ethyl]silyl]ethyl]silylpropanol.

Examples of the halogenated formate having formula (3) include methyl chloroformate, ethyl chloroformate, propyl chloroformate, butyl chloroformate, pentyl chloroformate, hexyl chloroformate, heptyl chloroformate, octyl chloroformate, nonyl chloroformate, decyl chloroformate, isopropyl chloroformate, isobutyl chloroformate, sec-butyl chloroformate, tert-butyl chloroformate, cyclopentyl chloroformate, cyclohexyl chloroformate, vinyl chloroformate, propenyl chloroformate, butenyl chloroformate, isopropenyl chloroformate, isobutenyl chloroformate, phenyl chloroformate, benzyl chloroformate, methyl bromoformate, ethyl bromoformate, propyl bromoformate, butyl bromoformate, pentyl bromoformate, hexyl bromoformate, heptyl bromoformate, octyl bromoformate, nonyl bromoformate, decyl bromofomate, isopropyl bromoformate, isobutyl bromoformate, sec-butyl bromoformate, tert-butyl bromoformate, cyclopentyl bromoformate, cyclohexyl bromoformate, vinyl bromoformate, propenyl bromoformate, butenyl bromoformate, isopropenyl bromoformate, isobutenyl bromoformate, phenyl bromoformate, and benzyl bromoformate.

The molar ratio of the silyl alcohol compound having formula (2) to the halogenated formate having formula (3) is preferably from 0.1:1 to 1:10, more preferably from 0.5:1 to 1:5 from the economic aspect, though not limited thereto.

Examples of the base used for trapping hydrogen chloride formed as by-product include heterocyclic amines such as pyridine, picoline, 2,6-lutidine and bipyridine and tertiary amines such as trimethylamine, triethylamine, triphenylamine, 1,4-diazabicyclooctane, 1,5-diazabicyclononene and 1,8-diazabicycloundecene.

The amount of the base used is preferably 1.0 to 5.0 moles, more preferably 1.1 to 2.0 moles per mole of the halogenated formate, though not limited thereto.

During the condensation reaction, the pressure is preferably atmospheric pressure, though not limited thereto. The reaction atmosphere is preferably an inert gas atmosphere such as nitrogen or argon. Although the temperature is not particularly limited, it is preferably in a range of 0 to 200° C., more preferably 0 to 100° C. The reaction time is preferably 1 to 40 hours, more preferably 1 to 20 hours, though not limited thereto.

Although the condensation reaction may take place in a solventless system, a solvent may be used. Suitable solvents include hydrocarbon solvents such as pentane, hexane, cyclohexane, heptane, isooctane, benzene, toluene and xylene; ether solvents such as diethyl ether, tetrahydrofuran and dioxane; ester solvents such as ethyl acetate and butyl acetate; aprotic polar solvents such as acetonitrile, N,N-dimethylformamide and N-methylpyrrolidone; and chlorinated hydrocarbon solvents such as dichloromethane and chloroform. These solvents may be used alone or in admixture of two or more.

At the end of reaction, the hydrochloride salt formed as by-product is preferably removed by post-treatment such as separatory operation using deionized water or filtration. The amount of deionized water used for separatory operation is preferably 100 to 300 g, more preferably 100 g to 150 g per mole of the hydrochloride salt, though not limited thereto.

On use of the carbonate-containing silane compound obtained from the inventive method, the crude product after post-treatment may be used as such or further purified prior to use by any of various purification methods such as distillation, filtration, washing, column separation and solid adsorbent depending on the desired quality. Distillation purification is preferred for obtaining the compound of higher purity.

EXAMPLE

Examples of the invention are given below by way of illustration and not by way of limitation.

Example 1

Synthesis of methyl [dimethyl[2-(dimethylvinylsilyl)ethyl]silyl]methyl Carbonate A flask equipped with a stirrer, reflux condenser, dropping funnel and thermometer was charged with 30.4 g (0.15 mol) of dimethyl[2-(dimethylvinylsilyl)ethyl]silylmethanol, 14.2 g (0.18 mol) of pyridine, and 30 ml of toluene, and cooled to 0° C. To the flask, 15.6 g (0.17 mol) of methyl chloroformate was added dropwise over one hour. The contents were warmed up to room temperature and stirred for another 2 hours. Deionized water, 15 ml, was added thereto. The organic layer was separated and distilled, collecting 32.2 g of a fraction at a boiling point of 113° C./0.8 kPa.

This fraction was analyzed by mass, $^1$H-NMR and IR spectroscopy.

Figure 2:
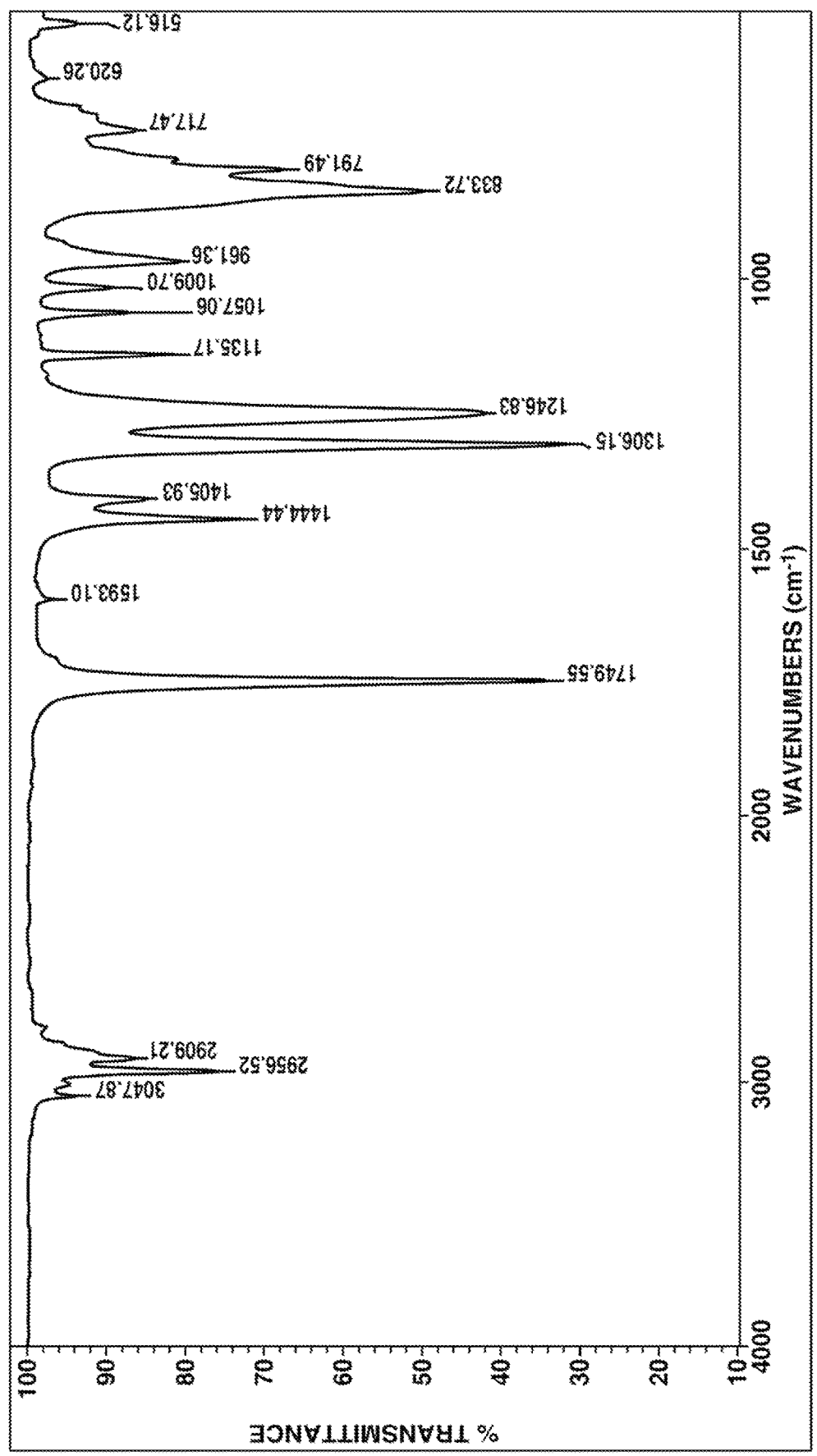
FIG. 2 is a diagram of the IR spectrum of the compound obtained in Example 1.

Mass spectrum: m/z 245, 231, 147, 89, 75, 59
$^1$H-NMR spectrum (in deuterated chloroform): FIG. 1
IR spectrum: FIG. 2

From these data, the compound was identified to be methyl [dimethyl[2-(dimethyl-vinylsilyl)ethyl]silyl]methyl carbonate.

Example 2

Synthesis of ethyl [dimethyl[2-(dimethylvinylsilyl) ethyl]silyl]methyl Carbonate A flask equipped with a stirrer, reflux condenser, dropping funnel and thermometer was charged with 30.4 g (0.15 mol) of dimethyl[2-(dimethylvinylsilyl)ethyl]silylmethanol, 14.2 g (0.18 mol) of pyridine, and 30 ml of toluene, and cooled to 0° C. To the flask, 17.9 g (0.17 mol) of ethyl chloroformate was added dropwise over one hour. The contents were warmed up to room temperature and stirred for another 2 hours. Deionized water, 15 ml, was added thereto. The organic layer was separated and distilled, collecting 26.8 g of a fraction at a boiling point of 114° C./0.6 kPa.

This fraction was analyzed by mass, $^1$H-NMR and IR spectroscopy.

Figure 3:
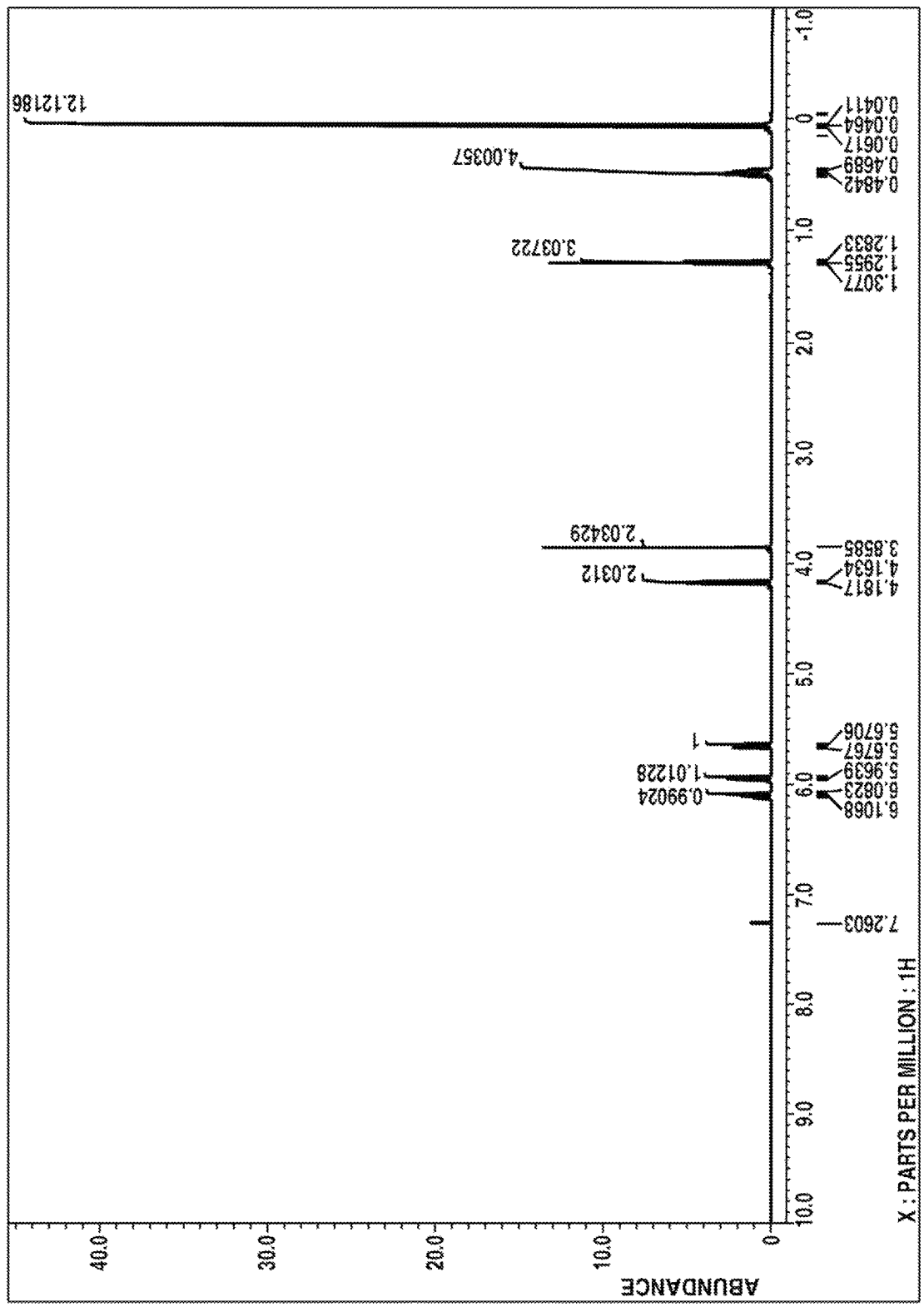
FIGS. 3 and 4 are diagrams of the $^1$H-NMR and IR spectra of the compound obtained in Example 2, respectively.
Figure 4:
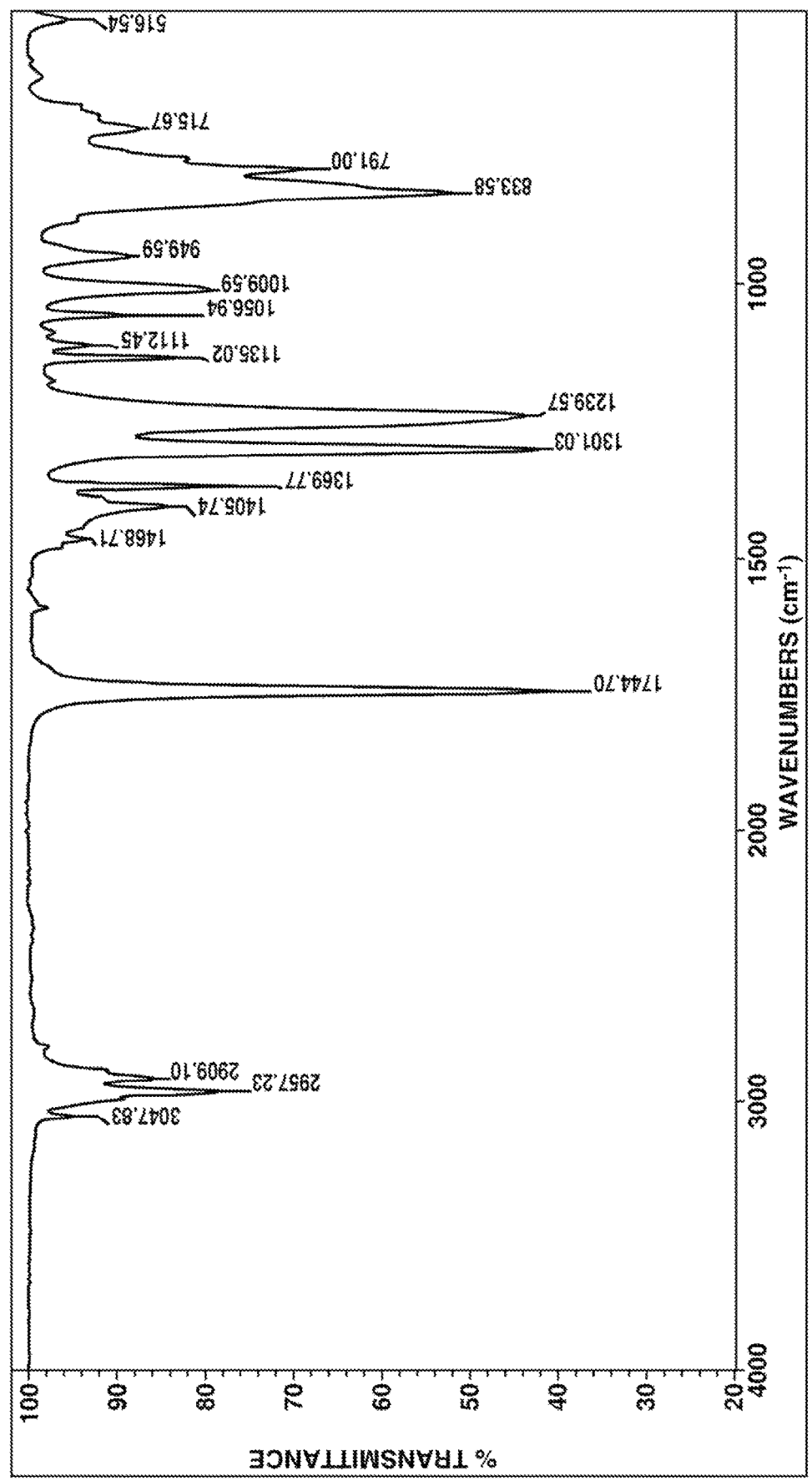

Mass spectrum: m/z 259, 161, 133, 85, 59
$^1$H-NMR spectrum (in deuterated chloroform): FIG. 3
IR spectrum: FIG. 4

From these data, the compound was identified to be ethyl [dimethyl[2-(dimethyl-vinylsilyl)ethyl]silyl]methyl carbonate.

Example 3

Synthesis of methyl [dimethyl[(dimethylvinylsilyl)methyl]silyl]methyl Carbonate

A flask equipped with a stirrer, reflux condenser, dropping funnel and thermometer was charged with 22.6 g (0.12 mol) of dimethyl(dimethylvinylsilylmethyl)silylmethanol, 11.4 g (0.15 mol) of pyridine, and 24 ml of toluene, and cooled to 0° C. To the flask, 12.5 g (0.13 mol) of methyl chloroformate was added dropwise over one hour. The contents were warmed up to room temperature and stirred for another 2 hours. Deionized water, 12 ml, was added thereto. The organic layer was separated and distilled, collecting 18.4 g of a fraction at a boiling point of 102° C./0.8 kPa.

This fraction was analyzed by mass, $^1$H-NMR and IR spectroscopy.

Figure 5:
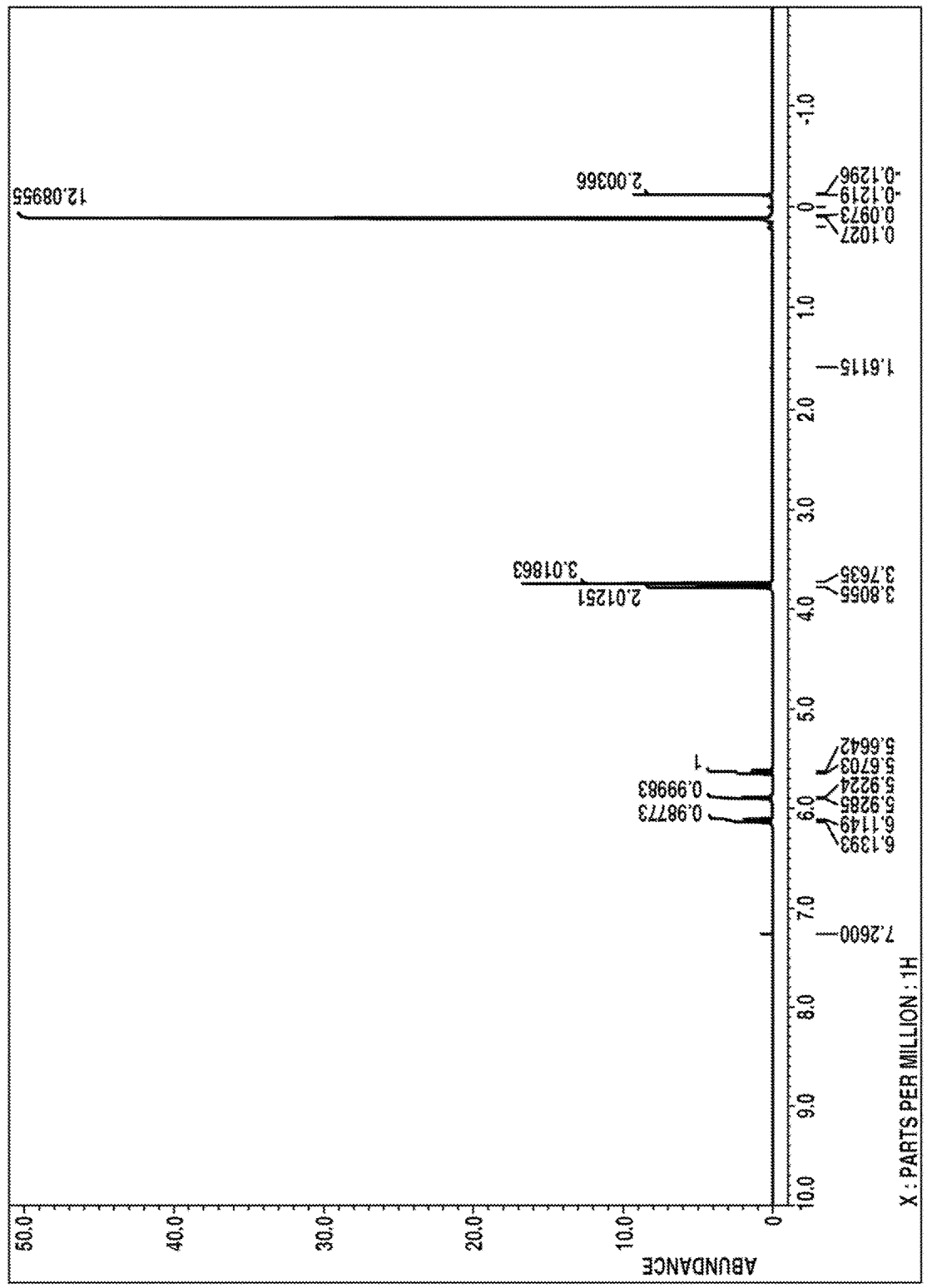
FIGS. 5 and 6 are diagrams of the $^1$H-NMR and IR spectra of the compound obtained in Example 3, respectively.
Figure 6:
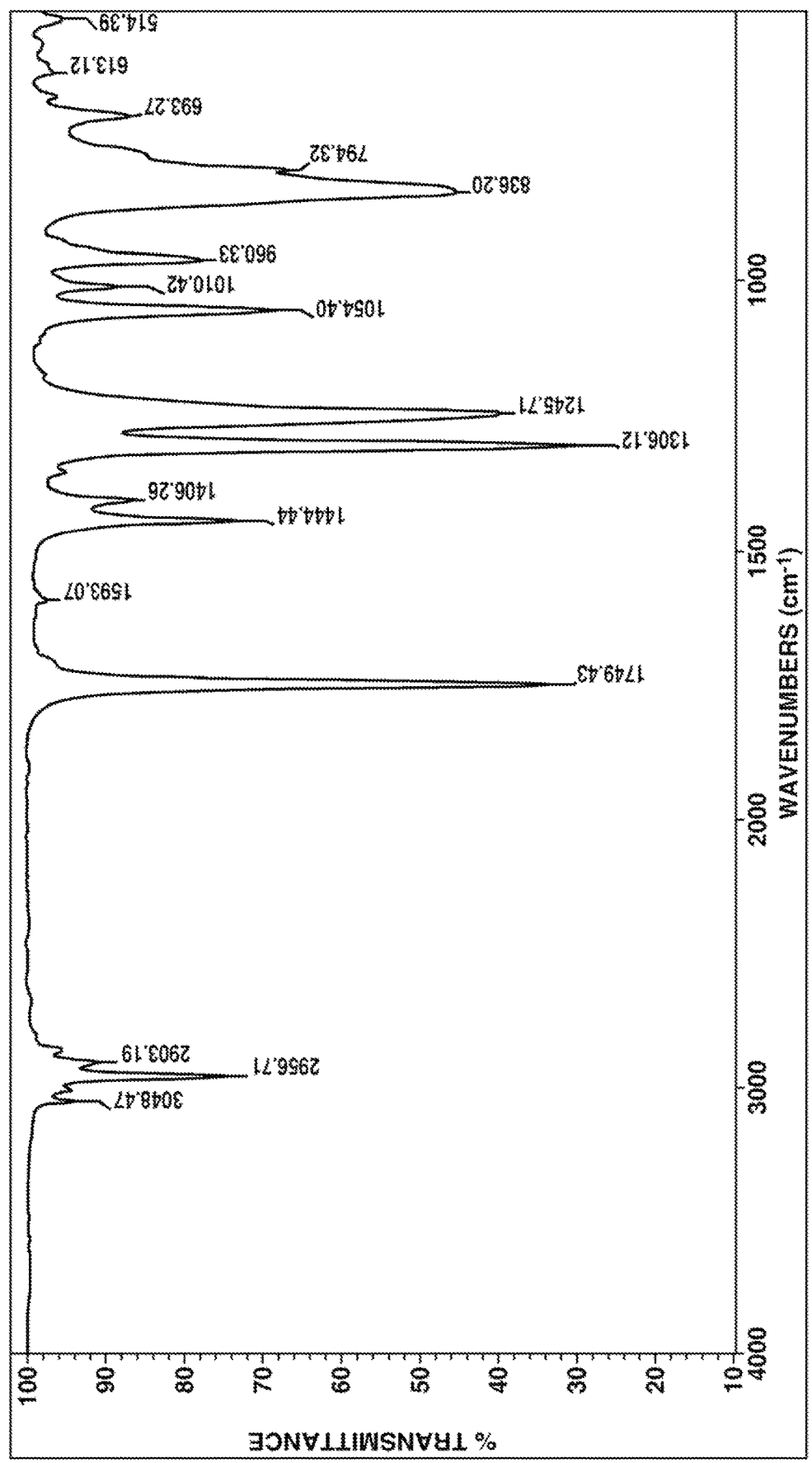

Mass spectrum: m/z 245, 187, 157, 117, 73, 59
$^1$H-NMR spectrum (in deuterated chloroform): FIG. 5
IR spectrum: FIG. 6

From these data, the compound was identified to be methyl [dimethyl[(dimethyl-vinylsilyl)methyl]silyl]methyl carbonate.

Example 4

Synthesis of ethyl [dimethyl[(dimethylvinylsilyl)methyl]silyl]methyl Carbonate

A flask equipped with a stirrer, reflux condenser, dropping funnel and thermometer was charged with 18.8 g (0.10 mol) of dimethyl(dimethylvinylsilylmethyl)silylmethanol, 9.5 g (0.12 mol) of pyridine, and 20 ml of toluene, and cooled to 0° C. To the flask, 12.0 g (0.11 mol) of ethyl chloroformate was added dropwise over one hour. The contents were warmed up to room temperature and stirred for another 2 hours. Deionized water, 10 ml, was added thereto. The organic layer was separated and distilled, collecting 19.0 g of a fraction at a boiling point of 112° C./0.8 kPa.

This fraction was analyzed by mass, $^1$H-NMR and IR spectroscopy.

Figure 7:
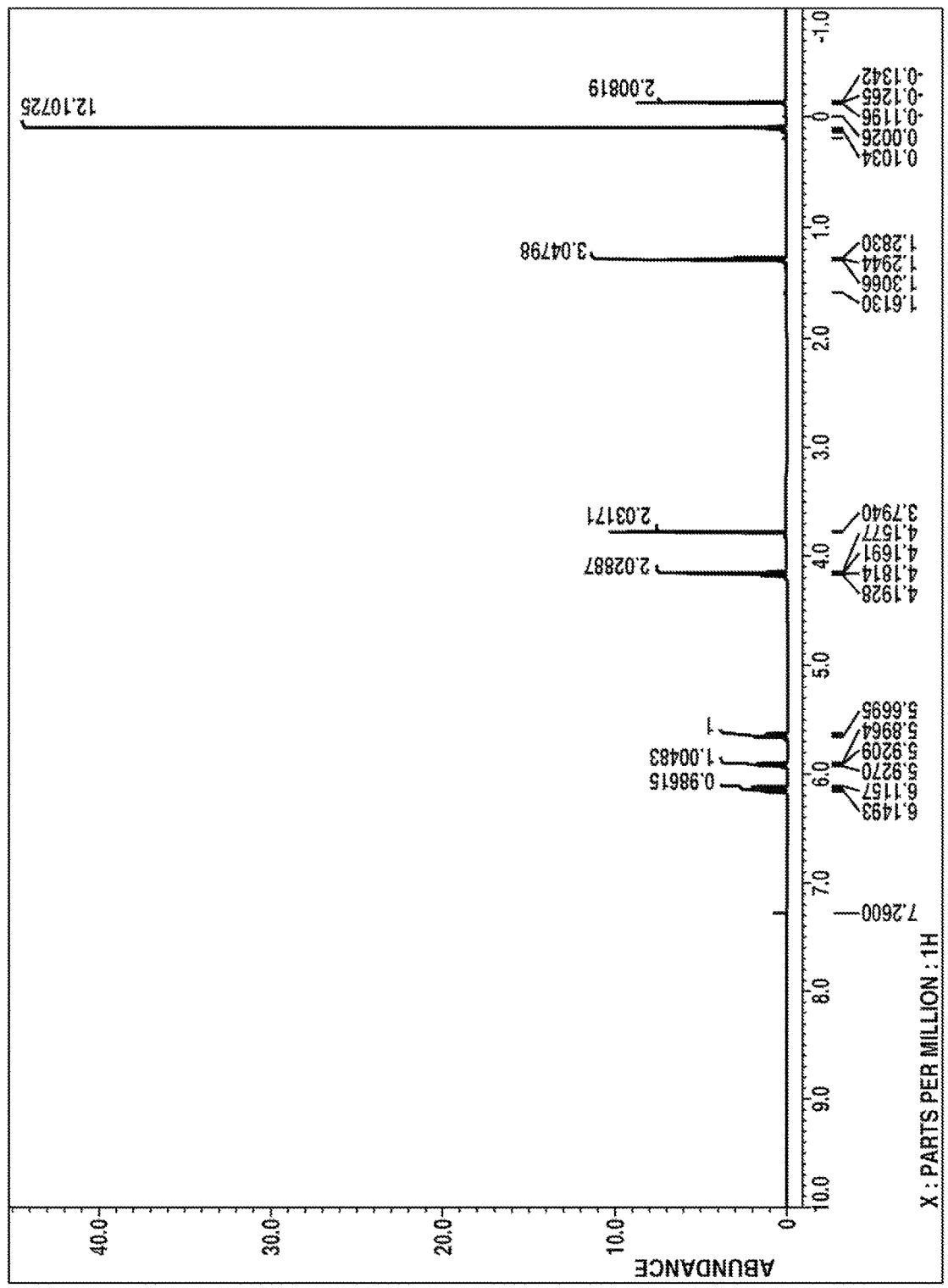
FIGS. 7 and 8 are diagrams of the $^1$H-NMR and IR spectra of the compound obtained in Example 4, respectively.
Figure 8:
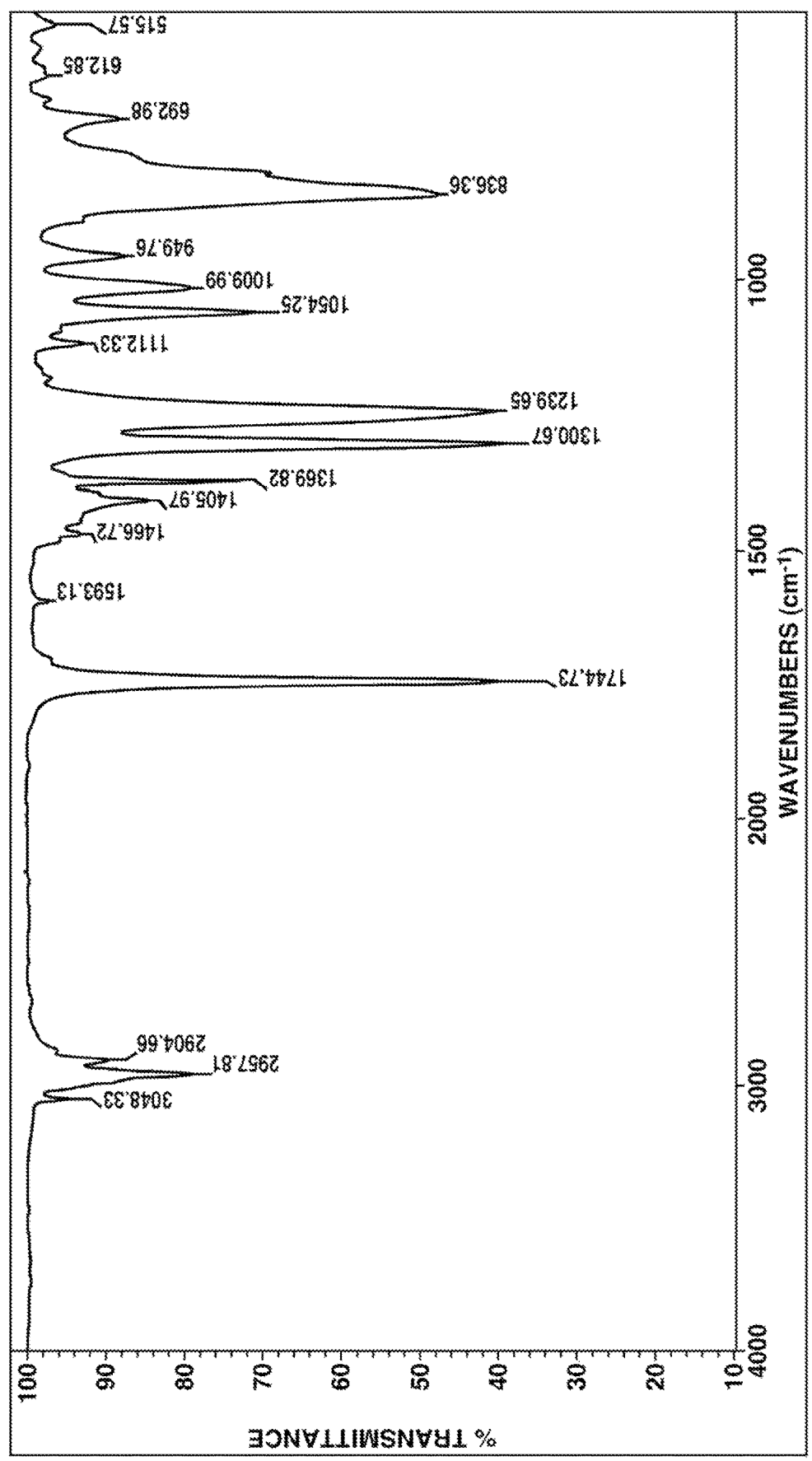

Mass spectrum: m/z 259, 245, 217, 157, 129, 115, 73, 59
$^1$H-NMR spectrum (in deuterated chloroform): FIG. 7
IR spectrum: FIG. 8

From these data, the compound was identified to be ethyl [dimethyl[(dimethylvinyl-silyl)methyl]silyl]methyl carbonate.

Japanese Patent Application No. 2018-103445 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A carbonate-containing silane compound having the general formula (1):

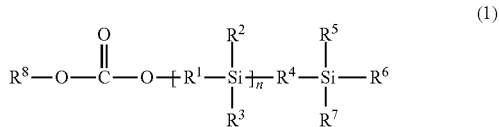

wherein $R^1$ and $R^4$ are each independently a substituted or unsubstituted $C_1$-$C_{10}$ straight or branched divalent hydrocarbon group, $R^2$, $R^3$, $R^5$, $R^6$ and $R^7$ are each independently a substituted or unsubstituted $C_1$-$C_{10}$ straight or branched alkyl or alkenyl group, $R^8$ is an unsubstituted $C_1$-$C_{10}$ monovalent hydrocarbon group, and n is 1 or 2, wherein at least one of $R^2$, $R^3$, $R^5$, $R^6$ and $R^7$ is a substituted or unsubstituted $C_2$-$C_{10}$ straight or branched alkenyl group.

2. A method for preparing the carbonate-containing silane compound of claim 1, comprising the step of effecting condensation reaction of a silyl alcohol compound having the general formula (2):

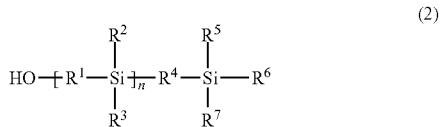

wherein $R^1$ to $R^7$ and n are as defined above, with a halogenated formate having the general formula (3):

wherein $R^8$ is as defined above and X is halogen in the presence of a base.

3. The method of claim 2 wherein the base is a heterocyclic amine or tertiary amine.

* * * * *